Figure 1:
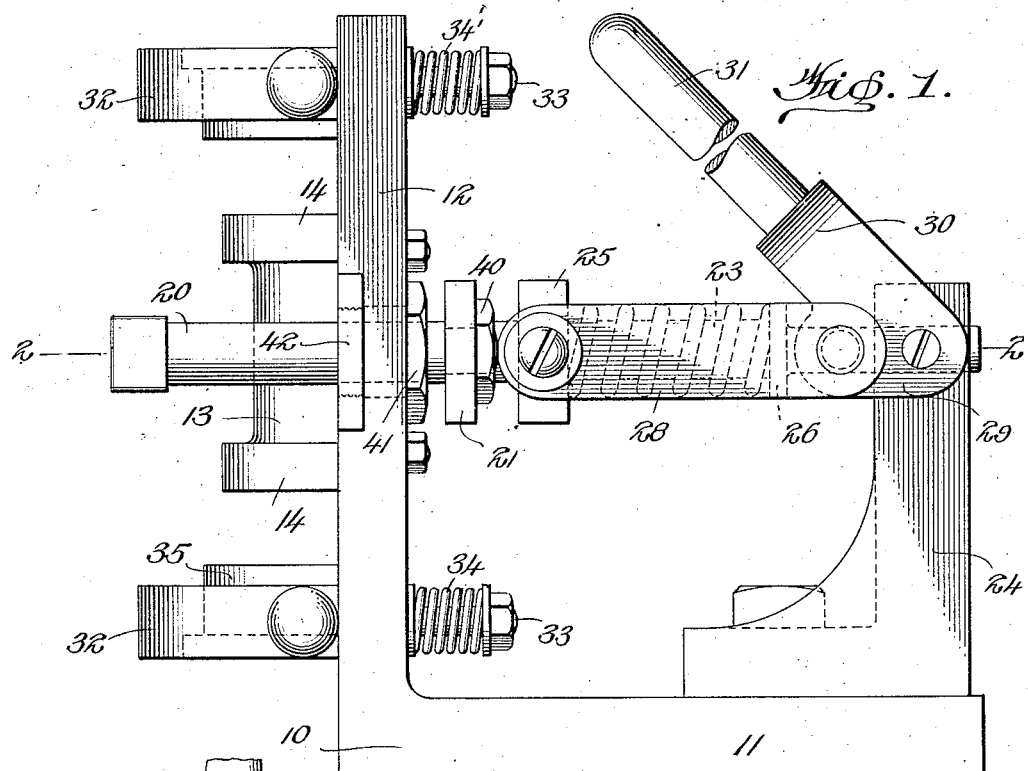

July 14, 1925.

E. A. WATKINS

MOLDING MACHINE

Filed Oct. 13, 1924

1,546,270

2 Sheets-Sheet 1

Inventor
E. A. Watkins,
by Bright & Bailey
Attorneys

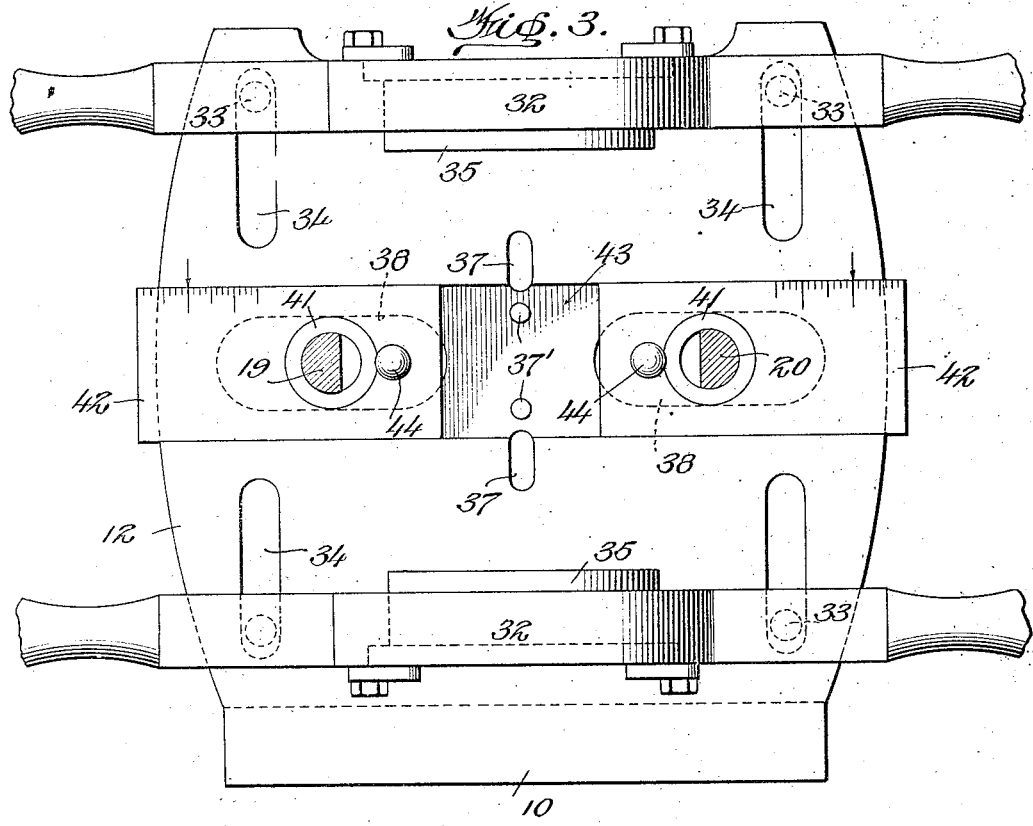
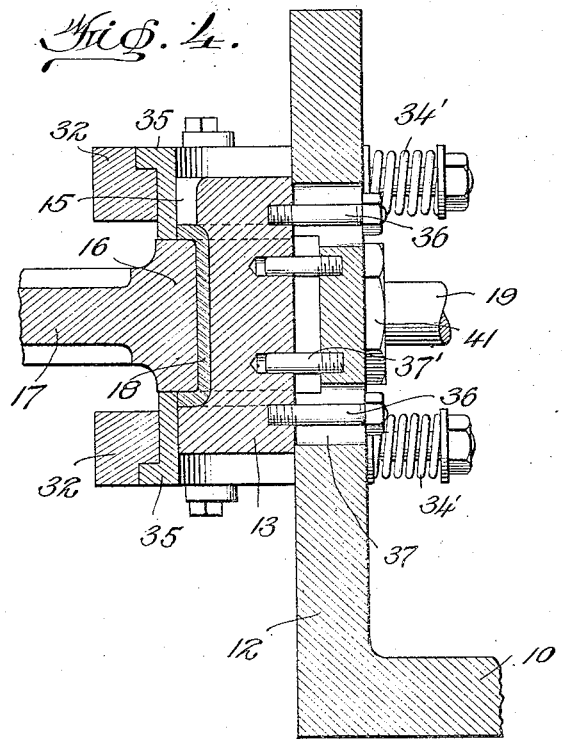
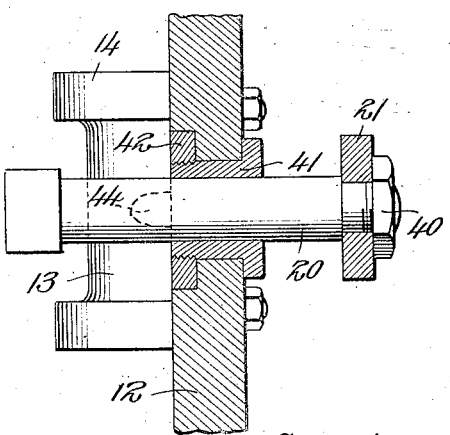

Patented July 14, 1925.

1,546,270

UNITED STATES PATENT OFFICE.

EVERETTE A. WATKINS, OF WICHITA, KANSAS, ASSIGNOR TO THE WATKINS MANUFACTURING COMPANY, OF WICHITA, KANSAS, A CORPORATION OF KANSAS.

MOLDING MACHINE.

Application filed October 13, 1924. Serial No. 743,341.

*To all whom it may concern:*

Be it known that I, EVERETTE A. WATKINS, a citizen of the United States, and resident of Wichita, in the county of Sedgwick and State of Kansas, have invented certain new and useful Improvements in Molding Machines, of which the following is a specification.

My invention relates to molding apparatus and has particular reference to improvements in the machine disclosed in my prior Patent 1,515,002 for use in casting Babbitt or like metal bearings in connecting rods and other machine elements, my present purpose being to provide a machine that retains all of the advantages of my prior machine and that, in addition, is adjustable to accurately accommodate connecting rods and other machine elements of different sizes.

My inventive idea is capable of embodiment in different mechanical structures, one of which is illustrated in the accompanying drawings, but it is to be understood that the structure herein shown is merely intended as a disclosure of the essential features and novel characteristics of my invention in a preferred form and that its scope is as defined in the appended claims.

In the drawings, wherein like characters of reference denote corresponding parts in the different views—

Figure 2:
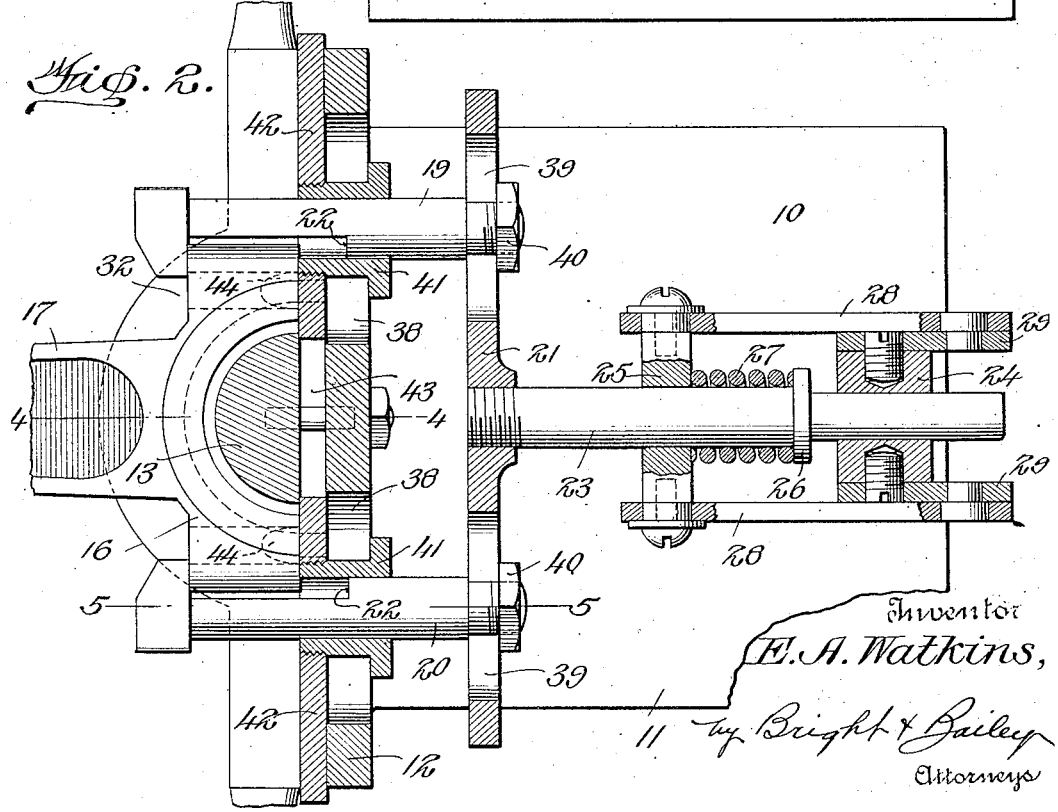

Figure 1 is a side elevation of my improved machine showing the parts thereof in normal or released position;

Figure 2, a horizontal section on the line 2—2 of Figure 1 showing the parts of the machine moved to a position clamping a connecting rod in position to have a bearing supplied thereto;

Figure 3, a front elevation of the machine, partly in section and with the die element removed;

Figure 4, a section on the line 4—4 of Figure 2; and

Figure 5, a section on the line 5—5 of Figure 2.

Referring to the drawings in detail, 10 designates a base plate including bottom and end portions 11 and 12, respectively, the former being horizontally disposed and adapted to be secured to a suitable support such as a work bench, and the latter being vertically disposed and carrying on its outer face a die 13.

The die 13 is of semi-cylindrical shape and is provided at its ends with flanges 14 that extend outward beyond its intermediate body portion, one flange, the upper, being provided with one or more recesses or openings as indicated at 15 for a purpose that will later appear.

The distance between the flanges 14 is slightly greater than the width of the end portion 16 of a connecting rod 17 that is adapted to be supplied with a bearing, and likewise the body portion of the die is formed slightly smaller than the bearing receiving recess in the end of the connecting rod, so that when the latter is properly positioned with respect to the machine, it will be spaced both intermediately and at its sides from the body portion and end flanges, respectively, of the die, the space thus provided being adapted to receive molten metal that is poured through the opening or openings 15 in the upper flange 14, whereby a bearing 18 is formed corresponding in size and shape to said space.

As in the machine of my prior patent, my present machine includes mechanism for clamping and holding a connecting rod against the base plate in operative relation to the die 13 during formation of a bearing, and for ejecting the connecting rod from the machine after the bearing has been formed and the clamping force on the rod has been removed. This mechanism includes a pair of dogs 19 and 20 in the form of headed pins located one to either side of the die 13 and slidable through openings in the vertical portion 12 of the base plate, said pins being connected together at their inner ends for simultaneous movement by a bar 21 and having their adjacent faces towards their outer headed ends cut away to provide shoulders 22, the heads of said pins being engageable with a connecting rod as shown in Figure 2 to clamp same against the base plate when inward movement is imparted to the bar 21, and the shoulders 22, which underlie the connecting rod when it is clamped against the base plate, being engageable with the rod to force the same away from the die and out of operative relation to the machine when the bar 21 is moved outwardly to release the rod.

Extending rearwardly from the bar 21 is a rod 23 that is slidable through a standard 24 rising from the bottom portion 11 of the base plate, and on said rod is slidably mounted a block 25, while on the rod rearwardly of said block is formed a flange 26, and between said block and flange is arranged an expansion coil spring 27 that react from the flange to project the block forwardly. A pair of links 28, 28 are pivoted at their forward ends to the sides of the block 25 and at their rear ends are pivoted to a pair of relatively short links 29, 29 that in turn are pivotally connected to the standard 24 and are connected together by a yoke 30 provided with a handle 31 whereby the links 29, 29 may be rotated to project and retract the links 28, 28 by a toggle action as is apparent. By this arangement it is thus apparent that when the handle 31 is swung forward to the position of Figure 1, the links 28, 28 will be projected forward and contact at their forward ends with the bar 21 and thus move said bar and with it the dogs 19, 20 to effect release of a connecting rod held by said dogs and at the same time, through shoulders 22, effect positive ejection of the connecting rod from the machine. On the other hand, when a connecting rod is disposed operatively with respect to the die 13 and the handle 31 is swung to the rear, the block 25 also will be moved to the rear and as a consequence the spring 27 will be compressed against flange 26 with the result that the rod 23 and bar 21 and with the latter the dogs 19, 20 will be drawn rearwardly, whereby the connecting rod will be clamped against the base plate as shown in Figure 2. From this arrangement it is manifest that equal movements of the operating handle 31 may result in different movements of the dogs 19, 20 because of the interposition of the spring 27 between the block 25 and the flange 26, so that connecting rods or other pieces of work that are of different thickness may be clamped against the base plate by the same movements of the operating handle.

Also, as in my prior machine, my present machine includes means to close the babbitt receiving space between a connecting rod and the die 13 at the upper and lower ends of the latter as shown in Figure 4 to retain the molten babbitt within said space until it hardens, said means consisting of a pair of members 32, 32 one of which normally is disposed above and the other below the die. Each of these members is provided with a pair of studs or pins 33 that extend through vertically disposed slots 34 in the portion 12 of the base plate and that are surrounded by coil springs 34' reacting from the rear face of portion 12 of the base plate against nuts threaded on the ends of said pins or studs to draw the members into engagement with the outer face of portion 12, thereby to frictionally retain the members in any vertically adjusted position within the limits defined by the length of the slots 34. A semi-circular recess is formed in each member 32, 32 and bushings 35 of different sizes are provided to be secured within said recesses whereby a snug fit of the members 32, 32 around the end portions 14 of dies 13 of different sizes may be secured.

The dies 13 of different sizes are equipped with studs 36 engageable through openings 37 in the portion 12 of the base plate and on these studs nuts are adapted to be threaded as shown in Figure 2 to retain the dies against said portion 12, proper positioning of a selected die with respect to the dogs 19, 20 and the members 32, 32 being assured by dowel pins 37' that project from the portion 12 and that are engageable within openings similarly located in each die to receive them.

Where dies 13 and members 32 of different sizes are used to adapt the machine for operation on connecting rods of different sizes, it is desirable that provision be made whereby the dogs or pins 19, 20 may be adjusted to proper position with respect to a selected die, and to this end the openings 38 in the portion 12 of the base plate and the openings 39 in the bar 21 through which the dogs or pins extend are elongated transversely of the machine, the elongation of said openings permitting the dogs or pins to be moved towards and away from the die as is manifest.

At their inner ends the dogs or pins 19, 20 are provided with reduced threaded extensions that are passed through the elongated openings 39 in the bar 21, said reduced extensions forming shoulders that are engageable with the forward face of the bar at the edges of said openings, and nuts 40 are threaded on said reduced extensions to clamp said shoulders against the bar and thus lock the lugs or pins in adjusted positions with respect thereto.

The openings 38 are formed of greater width than the diameter of the dogs or pins 19, 20 and the latter are passed through guide bushing members 41 that in turn extend through said openings 38 and at their forward ends are threaded into plates 42, 42 respectively, slidably fitted into a channel 43 formed in and extending transversely across the front face of the portion 12 of the base plate. At their rear ends said bushing members are provided with flanged heads engageable with the rear face of portion 12, so that by tightening said bushings the plates 42, 42 are clamped against the portion 12 and held against sliding movement with the result that the guide bushings also are locked against sliding movement, while on the other hand, by loosening said bushings the clamping forces on the plates 42, 42 are removed and the latter may be moved to adjust the bushings through the elongated openings 38. Preferably graduations are formed on the plates 42, 42 for cooperation with fixed points or lines on the portion 12, so that equal adjustments of the respective plates may quickly and accurately be effected.

To assure accurate positioning of a connecting rod with respect to a die 13 merely by the act of moving the connecting rod into operative relation to the machine, dowel pins 44 are provided on the plates 42, 42 to engage within the usual bolt openings of the rod, and since said dowel pins are carried by the plates 42, 42, it is manifest that adjustments thereof are effected simultaneously with movements of the plates to adjust the positions of the dogs or pins 19, 20.

I claim:

1. A machine of the character described comprising a base plate, a die carried thereby, mechanism for clamping a piece of work in operative relation to said die, and dowel pins adjacent to said die engageable within openings in the piece of work to position the latter accurately with respect to said die.

2. A machine of the character described comprising a base plate, means whereby dies of different sizes may be secured thereto, means for clamping a piece of work in operative relation to a die secured to said base plate, means whereby said clamping means may be adjusted to predetermined relation with dies of different sizes, dowel pins engageable within openings in the piece of work to position the latter with respect to a die carried by the base plate, and means for adjusting said dowel pins to predetermined relation with dies of different sizes.

3. A machine of the character described comprising a base plate, means for clamping a piece of work in operative relation to a die carried by said base plate, dowel pins supported by said base plate and engageable within openings in a piece of work to position the latter correctly with respect to a die on said base plate, and means for adjusting said dowel pins to position correctly pieces of work of different sizes.

4. A machine of the character described comprising a base plate provided with means whereby a die may be secured thereto, means for clamping a piece of work in operative relation to a die secured to said base plate, a pair of members movable across said base plate towards and away from a die secured thereto, and dowel pins carried by said members engageable within openings in a piece of work to position the latter correctly with respect to said die.

5. A machine of the character described comprising a base plate, means whereby dies of different sizes may be secured thereto, a pair of plates slidable across said base plate towards and away from a die secured to the base plate, work clamping dogs extending through said plates and movable therewith, and means for operating said dogs to clamp a piece of work in operative relation to a die secured to the base plate.

6. A machine of the character described comprising a base plate, means whereby dies of different sizes may be secured thereto, a pair of plates slidable across said base plate towards and away from a die secured to the base plate, said base plate having elongated openings formed therein, bushings extending through said openings and threaded into said slidable plates, clamping dogs extending through said bushings into position to clamp a piece of work operatively with respect to a die secured to the base plate, and means for operating said clamping dogs.

7. A machine of the character described comprising a base plate, means whereby dies of different sizes may be secured thereto, a pair of members adjustable across said base plate towards and from a die secured thereto, work clamping dogs extending through said members and movable therewith, means for securing said members in adjusted positions, and means for operating said dogs.

8. A machine of the character described comprising a base plate, means whereby dies of different sizes may be secured thereto, a pair of plates adjustable across said base plate towards and away from a die secured thereto, said base plate having elongated openings therein, work clamping dogs slidable through said plates and extending through the elongated openings in said base plate, means for securing said plates in adjusted positions, means for operating said dogs including a bar having slots therein through which said dogs extend, and means for securing said dogs in adjusted positions along the slots in said bar.

In testimony whereof I hereunto affix my signature.

EVERETTE A. WATKINS.